(12) United States Patent
Song et al.

(10) Patent No.: US 7,452,933 B2
(45) Date of Patent: Nov. 18, 2008

(54) CROSS-LINKED POLYETHYLENE HAVING EXCELLENT INHIBITION OF SWEAT-OUT AND INSULATION PROPERTIES

(75) Inventors: Youngil Song, Daejeon (KR); Ingyu Park, Daejeon (KR); Yoonsun Nam, Daejeon (KR); Deukju Kim, Daejeon (KR)

(73) Assignee: LG Chem, Ltd. (KR)

( * ) Notice: Subject to any disclaimer, the term of this patent is extended or adjusted under 35 U.S.C. 154(b) by 14 days.

(21) Appl. No.: 11/608,463

(22) Filed: Dec. 8, 2006

(65) Prior Publication Data

US 2007/0203278 A1    Aug. 30, 2007

(30) Foreign Application Priority Data

Feb. 24, 2006 (KR) .................. 10-2006-0018452
Jul. 11, 2006 (KR) .................. 10-2006-0065026

(51) Int. Cl.
*C08K 5/13* (2006.01)
(52) U.S. Cl. .................. 524/351; 524/347; 524/330; 524/331
(58) Field of Classification Search .................. 524/347, 524/351, 330, 331
See application file for complete search history.

(56) References Cited

U.S. PATENT DOCUMENTS

| 4,144,202 | A |   | 3/1979  | Ashcraft et al. |
| 4,206,260 | A |   | 6/1980  | McMahon |
| 4,305,849 | A |   | 12/1981 | Kawasaki et al. |
| 4,440,671 | A |   | 4/1984  | Turbett |
| 5,128,397 | A | * | 7/1992  | Horsey et al. ............... 524/290 |
| 6,869,995 | B2 | * | 3/2005  | Caronia et al. .............. 524/330 |

FOREIGN PATENT DOCUMENTS

KR    10-2002-0007925    1/2002

* cited by examiner

*Primary Examiner*—Ling-Siu Choi
(74) *Attorney, Agent, or Firm*—Cantor Colburn LLP

(57) ABSTRACT

The present invention relates to a cross-linked polyethylene composition having outstanding sweat-out inhibition and insulation properties. The composition of the invention characteristically comprises (A) 100 weight part of polyethylene; (B) 0.2-0.6 weight part of a mixture of a liquid antioxidant and a hindered phenol or thio ester antioxidant; (C) 0.2-0.9 weight part of polyethylene glycol having a molecular weight of 5,000-70,000; and (D) 1-4 weight part of a cross-linking agent.

20 Claims, 2 Drawing Sheets

【Figure 1a】
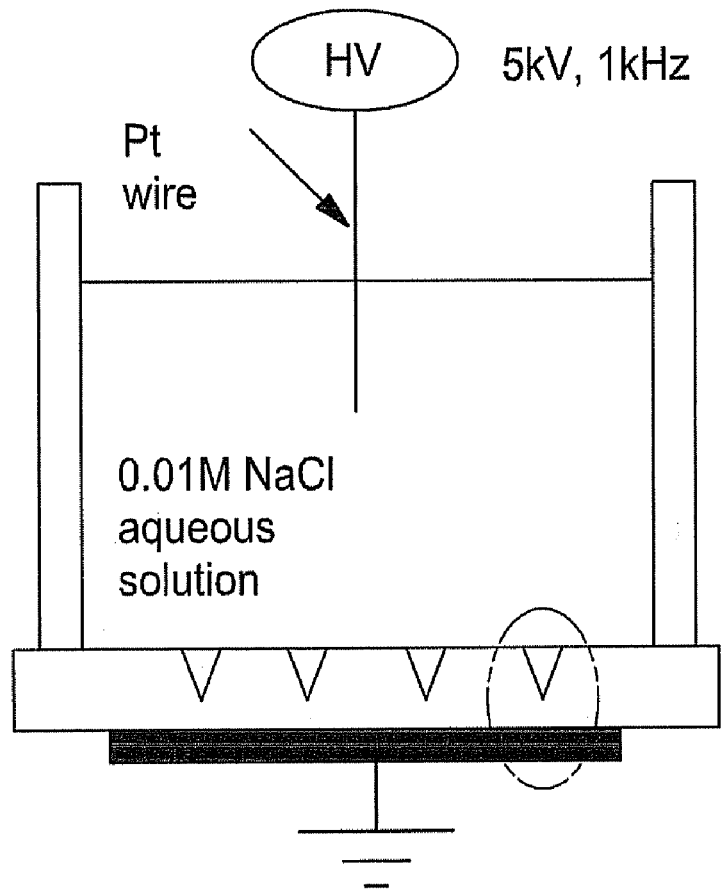
【Figure 1b】
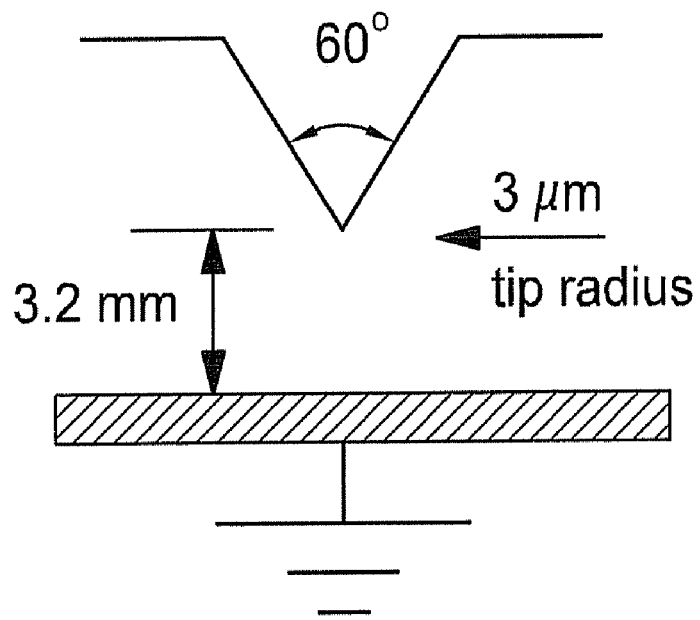

[Figure 2]
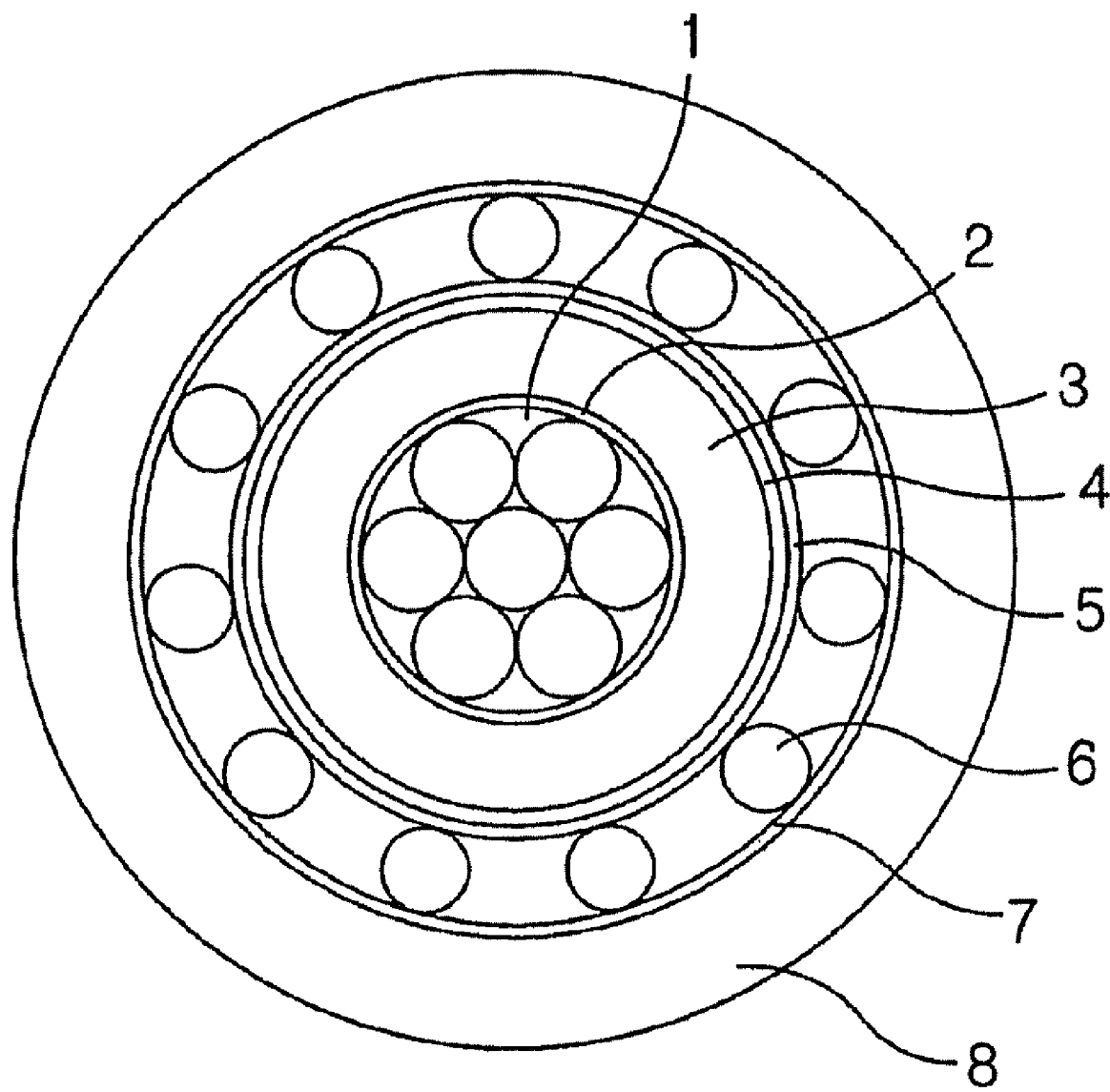

CROSS-LINKED POLYETHYLENE HAVING EXCELLENT INHIBITION OF SWEAT-OUT AND INSULATION PROPERTIES

This application claims the benefit of the filing date of Korean Patent Application Nos. 10-2006-0018452 filed on Feb. 24, 2006 and 10-2006-0065026 filed on Jul. 11, 2006 in the Korean Intellectual Property Office, the disclosure of which is incorporated herein in its entirety by reference.

TECHNICAL FIELD

The present invention relates to a cross-linked polyethylene composition for power cable insulation, which comprises (A) 100 weight part of polyethylene; (B) 0.2-0.6 weight part of a mixture of a liquid antioxidant and a hindered phenol or thio ester antioxidant; (C) 0.2-0.9 weight part of polyethylene glycol having a molecular weight of 5,000-70,000; and (D) 1-4 weight part of a cross-linking agent. The composition of the present invention has excellent resistance against water tree, caused when power cable insulation is exposed to moisture and an electric field, and outstanding sweat-out inhibition and insulation properties.

BACKGROUND ART

It is understood that water tree is a kind of micro-deterioration of an insulation caused by the simultaneous exposure of a cable insulation to both water and an electric field. Particularly, it has been known that water trees develop by the interaction between water, the void formed inside the insulation, and impurities from outside in the electric field-concentrated region, for example a rough interface or protrusion between an insulation and the semiconductive layer.

The conventional methods to inhibit water trees are as follows; a substitution of steam curing process with gas curing process in order to prevent water or impurities from entering a cable, and to minimize the void and moisture forming in the cable insulation during cable production; triple coextrusion to enhance interfacial smoothness between the semiconductive layer and the insulating layer; and interception of incoming water or impurities such as ions by utilizing a metal shielding layer or water-absorbing tape, or by replacing PVC jacket with PE jacket.

Even if a cable is produced by one of the above methods, water and voids are inevitably formed as a cross-linking by-product during cable production processes and there is no way to intercept water or ions entering from the external environment.

Accordingly, water-tree mediated incidents have been frequently reported and thus there is an urgent need to develop a new insulation material having strong resistance against water-tree generation to provide electrical stability and efficiency.

Attempts made to overcome the above problems are illustrated in the following descriptions:

U.S. Pat. No. 4,206,260 illustrates a method using an inorganic filler such as polycarboxylic ester, fatty acid metal salt, organic isocyanate or silicon compound, starting with the addition of alcohol.

In particular, U.S. Pat. Nos. 4,305,849 and 4,440,671 describe that water tree growth is remarkably retarded by the addition of 0.5-1.0 weight part of polyethylene glycol having a molecular weight of 1,000-20,000.

Although 4,4'-thiobis(2-t-butyl-5-methylphenol) used in the above patents is the representative thermal oxidation inhibitor, which has been widely applied to cross-linked insulation for high-voltage cables, it is a fine powder and has a high melting point of 160-163° C., suggesting that it cannot be melted well at the desired cable processing temperature of 125-135° C. Thus, mixing and dispersion with polyethylene melted in the extruder is decreased. An excess of quantity of 4,4'-thiobis(2-t-butyl-5-methylphenol) (more than 0.3 weight part) results in color change and sweat-out to the surface of a pellet, particularly when the temperature gap between the inside and outside is excess, and especially during summer and winter, during the long-term storage of the cross-linked polyethylene pellet (XLPE Pellet). At this time, unstable extrusion attributed to the dust generated during the transfer process through the extruder hopper is a problem.

If 4,4'-thiobis(2-t-butyl-5-methylphenol) is over-used, it remains locally indispersed in the vulcanization zone at high temperature, indicating that it is not able to provide regular thermal oxidation properties in the cable insulation, and even reduces the electrical insulation properties of the cable by providing a source for the generation and growth of water trees because of the local oxidation defect.

In the meantime, Korean Patent Publication No. 2002-007925 illustrates that the addition of liquid type 2,4-bis(n-octylthiomethyl)-6-methylphenol or 2,4-bis(n-dodecylthiomethyl)-6-methylphenol as an antioxidant might improve scorch resistance and blooming (sweat-out), compared with when the conventional amine or phenol antioxidant is used. However, the over-dose of such antioxidants (0.3 weight part) might also generate voids in the vulcanization zone at high temperature with high pressure.

DISCLOSURE OF INVENTION

It is an object of the present invention, to overcome the above problems, to provide a cross-linked polyethylene composition to improve irregular dispersion and sweat-out of the conventional solid type antioxidant having a high melting point such as 4,4'-thiobis(2-t-butyl-5-methylphenol), to reduce void generation by using a liquid type antioxidant such as 4,6-bis(octylthiomethyl)-o-cresol and at the same time to provide excellent insulation properties.

The present invention relates to a cross-linked polyethylene composition for power cable insulation, which comprises:

(A) 100 weight part of polyethylene;

(B) 0.2-0.6 weight part of a mixture of a liquid antioxidant represented by Formula 1 and a hindered phenol or thio ester antioxidant;

(C) 0.2-0.9 weight part of polyethylene glycol having a molecular weight of 5,000-70,000; and (D) 1-4 weight part of a cross-linking agent.

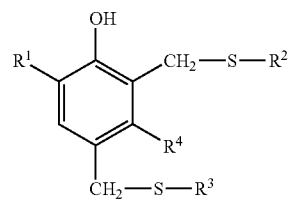

[Formula 1]

wherein, $R^1$ is $C_{1-20}$ alkyl substituted or non-substituted with one or more substituents selected from the group consisting of $C_{2-20}$ alkenyl, $C_{3-20}$ alkynyl, $C_{5-9}$ cycloalkyl, phenyl or tolyl, $R^2$ and $R^3$ are independently $C_{1-20}$ alkyl substituted or non-substituted with one or more substituents selected from the group consisting of phenyl, hydroxyl, cyano, formyl, acetyl and —O—$COR^5$, $R^5$ is $C_{5-9}$ cycloalkyl, phenyl, 4-chlorophenyl, 2-methoxycarbonylphenyl, p-tolyl, 1,3-benzthiazole-2-yl, —$(CHR^6)_n COOR^7$ or —$(CHR^6)_n CONR^8 R^9$ substituted or non-substituted with one or more substituents selected from the group consisting of $C_{1-20}$ alkyl, $C_{2-20}$ alkenyl, $C_{3-20}$ alkynyl or hydroxy, n is 1 or 2; $R^6$ is H or $C_{1-6}$ alkyl; $R^7$ is $C_{1-20}$ alkyl, $C_{1-20}$ alkyl containing 1-5 hetero atoms selected from O or S, $C_{5-9}$ cycloalkyl, phenyl, benzyl or tolyl; $R^8$ and $R^9$ are independently H or $C_{1-6}$ alkyl; $R^4$ is H or methyl.

The compositions of the present invention are described in detail by the following exemplary embodiments.

The polyethylene base resin (A) of the invention can be either ethylene homopolymer polymerized by free-radical initiation in a high pressure tubular (at least 1000 bar) or in an autoclave reactor or ethylene copolymer produced under low pressure (up to 100 bar) in the presence of Ziegler-Natta catalyst or metallocene catalyst.

The metallocene catalyst is preferably an organometallic compound prepared by ligand binding between a cyclopentadiene derivative and a transition metal of 4b, 5b or 6b on the periodic table, and more preferably 4b or 5b such as titanium, zirconium, hafnium or vanadium.

Hereinabove, the ethylene copolymer is preferably prepared by using α-olefin having at least 3 carbons as a comonomer and the α-olefin having at least 3 carbons is preferably one or more compounds selected from a group consisting of propylene, 1-butene, 1-pentene, 1-hexene and 1-octene.

The polyethylene of the present invention includes very low density polyethylene, low density polyethylene, linear low density polyethylene and high density polyethylene. But, their density should be in the range of 0.87~0.96 g/cm³, melt index is to be 0.1~50 g/10 minutes and weight average molecular weight (Mw) is preferably in the range of 40,000~200,000. It is more preferred that the polyethylene of the invention has 0.90~0.93 g/cm³ of density, 0.5~10 g/10 minutes of melt index and an Mw of 60,000~150,000.

The antioxidant (B) used in the present invention is a mixture of a liquid antioxidant represented by Formula 1 and a solid antioxidant such as hindered phenol or thio ester antioxidant.

[Formula 1]

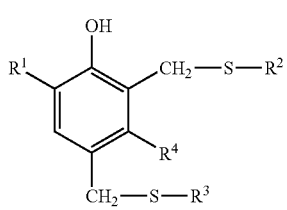

wherein, $R^1$ is $C_{1-20}$ alkyl substituted or non-substituted with one or more substituents selected from the group consisting of $C_{1-20}$ alkenyl, $C_{3-20}$ alkynyl, $C_{5-9}$ cycloalkyl, phenyl or tolyl, $R^2$ and $R^3$ are independently $C_{1-20}$ alkyl substituted or non-substituted with one or more substituents selected from the group consisting of phenyl, hydroxyl, cyano, formyl, acetyl and —O—$COR^5$, $R^5$ is $C_{5-9}$ cycloalkyl, phenyl, 4-chlorophenyl, 2-methoxycarbonylphenyl, p-tolyl, 1,3-benzthiazole-2-yl, —$(CHR^6)_n COOR^7$ or —$(CHR^6)_n CONR^8 R^9$ substituted or non-substituted with one or more substituents selected from the group consisting of $C_{1-20}$ alkyl, $C_{2-20}$ alkenyl, $C_{3-20}$ alkynyl or hydroxy, n is 1 or 2; $R^6$ is H or $C_{1-6}$ alkyl; $R^7$ is $C_{1-20}$ alkyl, $C_{1-20}$ alkyl containing 1-5 hetero atoms selected from O or S, $C_{5-9}$ cycloalkyl, phenyl, benzyl or tolyl; $R^8$ and $R^9$ are independently H or $C_{1-6}$ alkyl; $R^4$ is H or methyl.

$C_{1-20}$ alkyl radical is preferably methyl, ethyl, n-propyl, isopropyl, n-butyl, sec-butyl, tert-butyl, n-pentyl, isopentyl, n-hexyl, n-heptyl, 1,1-dimethylbutyl, n-octyl, 2-ethylhexyl, isooctyl (isomer mixture of primary octyl), n-nonyl, tert-nonyl (isomer mixture), n-decyl, 1,1,3,3-tetramethylbutyl (tert-octyl), n-dodecyl, tert-dodecyl (mixture of 1,1,3,3,5,5-hexamethylhexyl and 1,1,4,6,6-pentamethylhept-4-yl), n-tetradecyl, n-hexadecyl, n-octadecyl or n-eicosyl, $C_{2-20}$ alkenyl radical is preferably vinyl, allyl(prop-2-enyl), but-3-enyl, pent-4-enyl, hex-5-enyl, oct-7-enyl, dec-9-enyl or dodec-11-enyl, and more preferably allyl, $C_{3-20}$ alkynyl radical is preferably propargyl, but-3-ynyl, hex-5-ynyl, oct-7-ynyl, dec-9-ynyl, dodec-11-ynyl, tetradec-13-ynyl, hexadec-15-ynyl, octadec-17-ynyl or eicos-19-ynyl, and more preferably propargyl, $C_{5-9}$ cycloalkyl radical is preferably cyclopentyl, cyclohexyl, cycloheptyl, cyclooctyl or cyclononyl, and more preferably cyclohexyl, $C_{1-20}$ alkyl radical substituted with one or more substituents selected from a group consisting of phenyl or tolyl is preparably benzyl, penethyl, α-methylbenzyl, α,α-dimethylbenzyl, phenylbutyl, phenyl-α,α-dimethylpropyl, phenylhexyl, phenyl-α,α-dimethylbutyl, phenyloctyl or phenyl-α,α-dimethylhexyl, and more preferably benzyl, α-methylbenzyl or α,α-dimethylbenzyl, $C_{1-20}$ alkyl radical substituted with hydroxyl is preferably 2-hydroxyethyl, 2-hydroxypropyl, 2-hydroxybutyl, 2-hydroxyhexyl, 2-hydroxyoctyl, 2-hydroxydecyl, 2-hydroxydodecyl, 2-hydroxytetradecyl, 2-hydroxyhexadecyl, 2-hydroxyoctadecyl, 2-hydroxyeicosyl or 2,3-dihydroxypropyl, and more preferably 2-hydroxyethyl, 2-hydroxypropyl or 2,3-dihydroxypropyl, $C_{1-20}$ alkyl radical substituted with phenyl and hydroxyl is preferably 1-phenyl-2-hydroxyethyl, $C_{1-20}$ alkyl radical substituted with cyano is preferably 2-cyanoethyl, $C_{1-20}$ alkyl radical having 1-5 hetero atoms selected from a group consisting of O or S is preferably 3-oxapropyl, 3-thiapropyl, 3-oxabutyl, 3-thiabutyl, 3-oxapentyl, 3-thiapentyl, 3,6-dioxaheptyl, 3,6,9-trioxadecyl or 3,6,9,12,15,18-hexaoxanonadecyl.

It is preferred that, in a compound of Formula 1, $R^1$ is $C_{1-4}$ alkyl or more preferably methyl or tert-butyl; $R^2$ and $R^3$ are independently $C_{6-15}$ alkyl substituted or non-substituted with hydroxy, and more preferably $R^2$ and $R^3$ are equally n-octyl, tert-nonyl, n-dodecyl, tert-dodecyl, 2-hydroxyethyl or 2,3-dihydroxypropyl; and $R^4$ is H.

Examples of compounds represented by the above Formula (1) are as follows:

a) $R^1$=alkyl(methyl, tert-butyl, isopropyl, 2-ethylhexyl, 1,1-dimethylpropyl or 1,1-dimethylbutyl):

2,4-bis(2'-hydroxyethylthiomethyl)-6-methylphenol, 2,4-bis(2',3'-dihydroxypropylthiomethyl)-3,6-dimethylphenol, 2,4-bis(2'-acetyloxyethylthiomethyl)-3,6-dimethylphenol, 2,4-bis(2'-n-decanoyloxyethylthiomethyl)-6-methylphenol,
2,4-bis(n-octylthiomethyl)-6-methylphenol[4,6-bis(octylthiomethyl)-o-cresol],
2,4-bis(n-dodecylthiomethyl)-6-methylphenol[4,6-bis(dodecylthiomethyl)-o-cresol],
2,4-bis(tert-dodecylthiomethyl)-6-methylphenol,
2,4-bis(benzylthiomethyl)-6-methylphenol,
2,4-bis(2'-ethylhexyloxycarbonylmethylthiomethyl)-6-methylphenol,
2,4-bis(n-octadecyloxycarbonylmethylthiomethyl)-3,6-dimethylphenol,
2,4-bis(methylthiomethyl)-6-tert-butylphenol,
2,4-bis-(ethylthiomethyl)-6-tert-butylphenol,
2,4-bis-(n-propylthiomethyl)-6-tert-butylphenol,
2,4-bis-(n-butylthiomethyl)-6-tert-butylphenol,
2,4-bis-(n-hexylthiomethyl)-6-tert-butylphenol,
2,4-bis-(n-octylthiomethyl)-6-tert-butylphenol,
2,4-bis-(n-decylthiomethyl)-6-tert-butylphenol,
2,4-bis-(n-dodecylthiomethyl)-6-tert-butylphenol,
2,4-bis-(n-tetradecylthiomethyl)-6-tert-butylphenol,
2,4-bis-(n-hexadecylthiomethyl)-6-tert-butylphenol,
2,4-bis-(n-octadecylthiomethyl)-6-tert-butylphenol,
2,4-bis-(n-eicosylthiomethyl)-6-tert-butylphenol,
2,4-bis-(isopropylthiomethyl)-6-tert-butylphenol,
2,4-bis-(sec-butylthiomethyl)-6-tert-butylphenol,
2,4-bis-(tert-butylthiomethyl)-6-tert-butylphenol,
2,4-bis-(2-ethylhexylthiomethyl)-6-tert-butylphenol,
2,4-bis-(1,1,3,3-tetramethylbutylthiomethyl)-6-tert-butylphenol,
2,4-bis-(1,1,3,3,5,5-hexamethylhexylthiomethyl)-6-tert-butylphenol,
2,4-bis-[4-(2,2,4,6,6-pentamethylheptyl)-thiomethyl]-6-tert-butylphenol,
2,4-bis-(prop-2-enylthiomethyl)-6-tert-butylphenol,
2,4-bis-(prop-2-inylthiomethyl)-6-tert-butylphenol,
2,4-bis-(cyclohexylthiomethyl)-6-tert-butylphenol,
2,4-bis-(2-hydroxycyclohexylthiomethyl)-6-tert-butylphenol,
2,4-bis-(phenylthiomethyl)-6-tert-butylphenol,
2,4-bis-(phenylthiomethyl)-3-methyl-6-tert-butylphenol,
2,4-bis-(benzylthiomethyl)-6-tert-butylphenol,
2,4-bis-(p-tolylthiomethyl)-6-tert-butylphenol,
2,4-bis[2'-(2''-ethylhexyloxycarbonyl)ethylthiomethyl]-3-methyl-6-tert-butylphenol,
2,4-bis-(3-carboxy-2-thiapropyl)-6-tert-butylphenol dimethyl ester,
2,4-bis-(3-carboxy-2-thiapropyl)-6-tert-butylphenol dibutyl ester,
2,4-bis-(3-carboxy-2-thiapropyl)-6-tert-butylphenol dioctyl ester,
2,4-bis-(3-carboxy-2-thiapropyl)-6-tert-butylphenol didodecyl ester,
2,4-bis-(3-carboxy-2-thiapropyl)-6-tert-butylphenol monomethyl ester,
2,4-bis-(4-carboxy-2-thiapropyl)-6-tert-butylphenol dimethyl ester,
2,4-bis-(4-carboxy-2-thiabutyl)-6-tert-butylphenol dioctyl ester,
2,4-bis-(3-carboxy-2-thiapropyl)-6-tert-butylphenol di-(2-ethylhexyl)ester,
2,4-bis-(3-carboxy-2-thiabutyl)-6-tert-butylphenol dimethyl ester,
2,4-bis-(4-carboxy-3-methyl-2-thiapentyl)-6-tert-butylphenol dimethyl ester,
2,4-bis-(3-carboxy-2-thiapropyl)-6-tert-butylphenol N,N-dimethylamide,
2,4-bis-(3-carboxy-2-thiapropyl)-6-tert-butylphenol N,N-dihexylamide,
2,4-bis-(3-carboxy-2-thiapropyl)-6-tert-butylphenol N,N-didodecylamide,
2,4-bis-(4-carboxy-2-thiabutyl)-6-tert-butylphenol N,N-dimethylamide,
2,4-bis-[3-carboxy-2-thiabutyl]-6-tert-butylphenol N,N-dimethylamide,
2,4-bis-(4-carboxy-3-methyl-2-thiapentyl)-6-tert-butylphenol N,N-dibutylamide,
2,4-bis-(3-carboxy-2-thiapropyl)-6-tert-butylphenol dicyclohexyl ester,
2,4-bis-(3-carboxy-2-thiapropyl)-6-tert-butylphenol diphenyl ester,
2,4-bis-(3-carboxy-2-thiapropyl)-6-tert-butylphenol dibenzyl ester,
2,4-bis-(3-carboxy-2-thiapropyl)-6-tert-butylphenol di-p-tolyl ester,
2,4-bis-(3-carboxy-2-thiapropyl)-6-tert-butylphenol di-(3-thiabutyl)ester,
2,4-bis-(3-carboxy-2-thiapropyl)-6-tert-butylphenol di-(3-oxabutyl)ester,
2,4-bis-(3-carboxy-2-thiapropyl)-6-tert-butylphenol di-(N,N-dimethylamino-2-ethyl)ester,
2,4-bis-(3-carboxy-2-thiapropyl)-6-tert-butylphenol diamide,
2,4-bis-(3-carboxy-2-thiabutyl)-6-tert-butylphenol diamide,
2,4-bis-(prop-2-enylthiomethyl)-6-tert-butylphenol,
2,4-bis-(prop-2-inylthiomethyl)-6-tert-butylphenol,
2,4-bis-[2-hydroxyethylthiomethyl]-6-tert-butylphenol,
2,4-bis-[2-cyanoethylthiomethyl]-6-tert-butylphenol,
2,4-bis-[(4-methoxyphenyl)-thiomethyl]-6-tert-butylphenol,
2,4-bis-[(4-chlorophenyl)-thiomethyl]-6-tert-butylphenol,
2,4-bis-[(2-methoxycarbonylphenyl)-thiomethyl]-6-tert-butylphenol,
2,4-bis-[(1,3-benzthiazol-2-yl)-thiomethyl]-6-tert-butylphenol,
2,4-bis-[2,3-dihydroxypropylthiomethyl]-6-tert-butylphenol,
2,4-bis-[(3,5-di-tert-butyl-4-hydroxyphenyl)thiomethyl]-6-tert-butylphenol,
2,4-bis-[4-(3,5-di-tert-butyl-4-hydroxyphenyl)-2-thiabutyl]-6-tert-butyl phenol,
2,4-bis-[4-acetoxy-2-thiabutyl]-6-tert-butylphenol,
2,4-bis-[3-formyl-2-thiabutyl]-6-tert-butylphenol,
2,4-bis-[3-acetyl-2-thiabutyl]-6-tert-butylphenol.
2,4-bis-(n-octylthiomethyl)-6-isopropylphenol,
2,4-bis-(n-dodecylthiomethyl)-6-isopropyl phenol,
2,4-bis-(n-octylthiomethyl)-6-(2-ethylhexyl)-phenol,
2,4-bis-(n-dodecylthiomethyl)-6-(2-ethylhexyl)-phenol,
2,4-bis-(n-dodecylthiomethyl)-6-(1,1-dimethylpropyl)-phenol,
2,4-bis-(n-octylthiomethyl)-6-(1,1-dimethylbutyl)-phenol, and
2,4-bis-(n-dodecylthiomethyl)-6-(1,1-dimethylbutyl)-phenol.
b) $R^1$=cycloalkyl(cyclohexyl):
2,4-bis-(n-octylthiomethyl)-6-cyclohexylphenol, and
2,4-bis-(n-dodecylthiomethyl)-6-cyclohexylphenol.
c) $R^1$=phenyl or tolyl:
2,4-bis-(n-octylthiomethyl)-6-phenylphenol,
2,4-bis-(n-dodecylthiomethyl)-6-phenylphenol,
2,4-bis-(n-octylthiomethyl)-6-p-tolylphenol, and
2,4-bis-(n-dodecylthiomethyl)-6-p-tolylphenol.

d) R¹=alkyl(benzyl,α,α-dimethylbenzyl) substituted with phenyl:
2,4-bis-(n-octylthiomethyl)-6-benzylphenol,
2,4-bis-(n-dodecylthiomethyl)-6-benzylphenol, and
2,4-bis-(n-dodecylthiomethyl)-6-(α,α-dimethylbenzyl)-phenol.
e) R¹=alkenyl(prop-2-enyl) or alkynyl(prop-2-ynyl):
2,4-bis-(n-octylthiomethyl)-6-prop-2-enylphenol,
2,4-bis-(n-dodecylthiomethyl)-6-prop-2-enylphenol, and
2,4-bis-(n-dodecylthiomethyl)-6-prop-2-inylphenol.

The most preferable compound among those represented by Formula 1 is 4,6-bis(octylthiomethyl)-o-cresol or 4,6-bis(dodecylthiomethyl)-o-cresol.

The hindered phenol antioxidant which elevates the anti-oxidative effect when co-used with a liquid antioxidant of Formula 1 is preferably one or more compounds selected from a group consisting of 2,2'-thiodiethylbis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2.2'-thiobis(6-t-butyl-4-methylphenol), octadecyl-[3-(3,5-di-t-butyl-4-hydroxyphenyl)-propionate], 4,4'-thiobis(2-t-butyl-5-methylphenol) and triethyleneglycol-bis-[3-(3-t-butyl-4-hydroxy-5-methylphenyl)propionate], but not always limited thereto.

The thio ester antioxidant which elevates the anti-oxidative effect when co-used with a liquid antioxidant of Formula 1 is preferably one or more compounds selected from a group consisting of disteryl thiodipropionate and dilauryl thiodipropionate, but is not always limited thereto.

The content of the antioxidant is 0.2-0.6 weight part for 100 weight part of polyethylene. Less than 0.2 weight part of the antioxidant content results in the decrease of thermal oxidation stability, risking the long-term safety of the cable. On the contrary, more than 0.6 weight part of the antioxidant content results in the decrease of the cross-linking capability of the cable causing deformation and decomposition by high temperature or heat, risking the long-term safety of the cable.

The preferable ratio of the liquid antioxidant of Formula 1 to the hindered phenol or thio ester antioxidant is 1:5-5:1 and a more preferable ratio is 1:3-3:1. If the liquid antioxidant content is out of the above ratio range, particularly if the content is less than 1:5, dispersion is decreased, whereas if the liquid antioxidant content is more than the ratio of 5:1, which means the solid antioxidant content becomes insufficient, void generation is observed.

The polyethylene glycol(C) of the present invention is a water tree retardant agent which has a molecular weight of 5,000-70,000 or more preferably 20,000-50,000. The content of polyethylene glycol for 100 weight part of polyethylene is 0.2-0.9 weight part and more preferably 0.3-0.8 weight part. Less than 0.2 weight part of polyethylene glycol content cannot exhibit water-tree inhibition effect, whereas more than 0.9 weight part of polyethylene glycol content significantly reduces physical and thermal aging properties of a cable insulation, making it less economical in industry.

The cross-linking agent (D) of the present invention plays a role in establishment of a cross-linking initiation point in base resin. The content of such a cross-linking agent for 100 weight part of polyethylene is 1-4 weight part and more preferably 1.5-3.0 weight part. With less than 1 weight part of the cross-linking agent content, the cross-linking action is not expected. On the contrary, more than 4 weight part of the cross-linking agent content reduces long-term workability.

A preferable cross-linking agent for the present invention is one or more compounds selected from a group consisting of dicumyl peroxide, benzoyl peroxide, lauryl peroxide, tert-butyl cumyl peroxide, di(tert-butyl peroxy isopropyl)benzene, 2,5-dimethyl-2,5-di(tert-butyl peroxy)hexane and di(tert-butyl)peroxide, but is not always limited thereto and among these compounds dicumyl peroxide (DCP) is most preferred.

The present invention also provides a preparation method of cross-linked polyethylene composition comprising stage 1 in which
(A) 100 weight part of polyethylene;
(B) 0.2-0.6 weight part of a mixture of a liquid antioxidant of Formula 1 and a hindered phenol or a thio ester antioxidant;
(C) 0.2-0.9 weight part of polyethylene glycol having a molecular weight of 5,000-70,000; and
(D) 1-4 weight part of a cross-linking agent are mixed and processed, and stage 2 in which cross-linking of an extrudate is performed at a higher temperature than the decomposition temperature of the cross-linking agent.

[Formula 1]

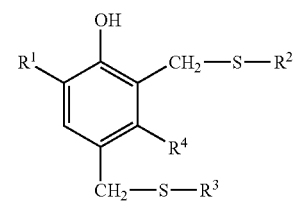

Wherein,
R¹ is $C_{1-20}$ alkyl substituted or non-substituted with one or more substituents selected from the group consisting of $C_{2-20}$ alkenyl, $C_{3-20}$ alkynyl, $C_{5-9}$ cycloalkyl, phenyl or tolyl, R² and R³ are independently $C_{1-20}$ alkyl substituted or non-substituted with one or more substituents selected from the group consisting of phenyl, hydroxyl, cyano, formyl, acetyl and —O—COR⁵, R⁵ is $C_{5-9}$ cycloalkyl, phenyl, 4-chlorophenyl, 2-methoxycarbonylphenyl, p-tolyl, 1,3-benzthiazole-2-yl, —(CHR⁶)$_n$COOR⁷ or —(CHR⁶)$_n$CONR⁸R⁹ substituted or non-substituted with one or more substituents selected from a group consisting of $C_{1-20}$ alkyl, $C_{2-20}$ alkenyl, $C_{3-20}$ alkynyl or hydroxy, n is 1 or 2; R⁶ is H or $C_{1-6}$ alkyl; R⁷ is $C_{1-20}$ alkyl, $C_{1-20}$ alkyl containing 1-5 hetero atoms selected from O or S, $C_{5-9}$ cycloalkyl, phenyl, benzyl or tolyl; R⁸ and R⁹ are independently H or $C_{1-6}$ alkyl; R⁴ is H or methyl.

Stage 1 of mixing and processing the composition is carried out by the conventional mixing and polymer processing methods. Particularly, this stage preferably includes the steps of preparing a master batch (a) containing an antioxidant mixture and polyethylene glycol mixture or an antioxidant mixture, polyethylene glycol and cross-linking agent mixture; and introducing polyethylene or polyethylene and a cross-linking agent mixture into an extruder to which the master batch prepared in the step (a) is added or each additive is directly added, followed by extrusion (b).

The mixing in the above step (a) is carried out by Banbury mixer and twin roll mill and the extrusion in the above step (b) is carried out by a twin extruder or single extruder with a mixing function.

The present invention also provides a cable containing the cross-linked polyethylene composition of the invention.

The cable structure is described in detail hereinafter according to an exemplary embodiment of the present invention with reference to FIG. 2. A cable, particularly an electrical power cable is composed of the conductor (1), the semiconductive layer (2,4), insulation (3), the neutral conductor (6) and the Jacket (8). The semiconductive layer is composed of the inner semiconductive layer (2) covering the conductor layer (1) and the outer semiconductive layer (4) covering the insulation (3). The cross-linked polyethylene composition of the present invention forms the insulation (3). The neutral conductor (6) is protected by inside and outside neutral shielding layers (5,7) and the outermost layer of a cable is the Jacket (8).

As shown in FIG. 2, according to the present invention, the cross-linked polyethylene composition preferably covers the conductor or the inner semiconductive layer of a cable.

BRIEF DESCRIPTION OF THE DRAWINGS

The above and other objects, features and advantages of the present invention will become apparent from the following description of preferred embodiments given in conjunction with the accompanying drawings, in which:

FIG. 1a and FIG. 1b are cross sections illustrating accelerated water tree degradation apparatus, FIG. 2 is a cross section illustrating a cable according to an exemplary embodiment of the invention.

BEST MODES FOR CARRYING OUR THE INVENTION

Practical and presently preferred embodiments of the present invention are illustrated as shown in the following examples.

However, it will be appreciated that those skilled in the art, on consideration of this disclosure, may make modifications and improvements within the spirit and scope of the present invention.

A. Measurement of Dispersion, Sweat-Out and Void

Dispersion, sweat-out and void levels were measured under the following conditions to check the problems of the conventional techniques.

1. Dispersion

After roll mill operation at 120° C. for 5 minutes, a cross-linked sheet was prepared at 180° C., which stood in a 160° C. oven for 4 hours. Then, color changes in the sheet were observed with the naked eye. According to the degree of color change, it was determined to be 'good', 'not bad' and 'bad'.

2. Sweat-Out 50 g of pellet was stirred in 100 ml of methanol for 5 minutes, followed by measuring the additives coming out of the pellet by using GC.

3. Void

A cross-linked sheet was prepared at 180□ for 5 minutes under 30 bar of pressure and then the number of voids in the cross-linked sheet was counted. When the number of voids was 0-1, it was regarded as 'good', 2-5 voids was regarded as 'average', 5-10 voids was regarded as 'not bad' and when the number of voids was at least 10, it was regarded as 'bad'.

REFERENCE EXAMPLE 1

To 100 weight part of polyethylene having a density of 0.921 g/cm$^3$ and a melt index of 2.0 g/10 minutes were added 2 weight part of a cross-linking agent (dicumyl peroxide), 0.2 weight part of the antioxidant 4,4'-thiobis(2-t-butyl-5-methylphenol) and 0.3 weight part of the water-tree retardant agent polyethylene glycol (molecular weight: 35,000), followed by mixing in a Banbury mixer at 130° C. The mixture was then extruded to prepare a pellet. The pellet was cross-linked at 180° C. for 15 minutes by using an automatic press. Then, dispersion, sweat-out and void generation were tested and the results are shown in Table 1.

REFERENCE EXAMPLE 2

An experiment was performed in the same manner as described in the above Reference Example 1, except that the antioxidant 4.4'-thiobis(2-t-butyl-5-methylphenol) was added by 0.35 weight part. Then, dispersion, sweat-out and void generation were investigated and the results are shown in Table 1.

REFERENCE EXAMPLE 3

An experiment was performed in the same manner as described in the above Reference Example 1, except that the antioxidant 4.4'-thiobis(2-t-butyl-5-methylphenol) was added by 0.5 weight part. Then, dispersion, sweat-out and void generation were investigated and the results are shown in Table 1.

REFERENCE EXAMPLE 4

An experiment was performed in the same manner as described in the above Reference Example 1, except that the antioxidant 4,6-bis(octylthiomethyl)-o-cresol was added by 0.2 weight part. Then, dispersion, sweat-out and void generation were investigated and the results are shown in Table 1.

REFERENCE EXAMPLE 5

An experiment was performed in the same manner as described in the above Reference Example 1, except that the antioxidant 4,6-bis(octylthiomethyl)-o-cresol was added by 0.35 weight part. Then, dispersion, sweat-out and void generation were investigated and the results are shown in Table 1.

REFERENCE EXAMPLE 6

An experiment was performed in the same manner as described in the above Reference Example 1, except that the antioxidant 4,6-bis(octylthiomethyl)-o-cresol was added by 0.5 weight part. Then, dispersion, sweat-out and void generation were investigated and the results are shown in Table 1.

TABLE 1

|  | Reference Example 1 | Reference Example 2 | Reference Example 3 | Reference Example 4 | Reference Example 5 | Reference Example 6 |
| --- | --- | --- | --- | --- | --- | --- |
| Low-density polyethylene | 100 | 100 | 100 | 100 | 100 | 100 |
| Cross-linking agent | 2.0 | 2.0 | 2.0 | 2.0 | 2.0 | 2.0 |
| Antioxidant A | 0.2 | 0.35 | 0.5 | — | — | — |
| Antioxidant B | — | — | — | 0.2 | 0.35 | 0.5 |

TABLE 1-continued

|  | Reference Example 1 | Reference Example 2 | Reference Example 3 | Reference Example 4 | Reference Example 5 | Reference Example 6 |
|---|---|---|---|---|---|---|
| Tree retardant agent | 0.3 | 0.3 | 0.3 | 0.3 | 0.3 | 0.3 |
| Dispersion | Good | Not bad | Bad | Good | Good | Good |
| Sweat-out (ppm) | 450 | 800 | 1500 | 30 | 50 | 60 |
| Void | Good | Good | Good | Good | Not bad | Bad |

1. Low-density polyethylene: LUTENE ® CB2030 (LG chem., Ltd., Korea)
2. Cross-linking agent: dicumyl peroxide (DCP)
3. Antioxidant A: 4,4'-thiobis(2-t-butyl-5-methylphenol)
4. Antioxidant B: 4,6-bis(octylthiomethyl)-o-cresol
5. Tree retardant agent: polyethylene glycol As shown in Table 1, in the case of using a solid type antioxidant, 4,4'-thiobis(2-t-butyl-5-methylphenol) alone in Reference Examples 1-3, dispersion was very poor and sweat-out was significantly observed. In the meantime, in the case of using a liquid antioxidant, 4,6-bis(octylthiomethyl)-o-cresol alone in Reference Examples 4-6, dispersion and sweat-out were good but void generation was observed.

B. Cross-Linking and Electrical Insulation Properties

A variety of cross-linked polyethylene compositions were prepared to investigate dispersion, sweat-out and void levels under the same conditions as the above, and in particular dispersion was measured as follows.

1. Degree of Cross-Linking

To the boiling xylene solution was added 0.2-0.3 g of thin sectioned samples, followed by reflux for 24 hours. The weight of the remaining samples was measured and the degree of cross-linking was calculated by the following formula.

degree of cross-linking (%)=[Sample weight before measurement−Sample weight after measurement]/[Sample weight before measurement]×100

2. Hot Elongation

According to the method described in IEC 811, the length of the sample measured at 200° C./15 minutes under 20N/cm$^2$ was calculated as a percentage.

3. Tensile Strength and Elongation at Room Temperature

According to the method described in IEC 811, samples were measured by UTM (universal test machine).

4. Tensile Strength and Elongation After Aging

The samples were aged in a 135° C. dry oven for 30 days and then tested by using UTM (universal test machine) according to the method described in IEC 811.

5. Scorch Resistance

The sample was tested for scorch resistance at 160° C., 0.5° arc and 50 rpm for 12 minutes and then the elapsed time for 90% of maximum torque was measured and presented as min:sec.

6. Electric Insulation Property

Cross-linking was induced at 180° C. for 15 minutes to prepare a 0.3 mm thick sheet, then an AC withstand voltage test was performed to measure the minimum insulation breakdown strength.

EXAMPLE 1

An experiment was performed in the same manner as described in Reference Example 1 except that 0.25 weight part of the antioxidant 4,4'-thiobis(2-t-butyl-5-methylphenol), 0.1 weight part of 4,6-bis(octylthiomethyl)-o-cresol and 0.5 weight part of the water tree retardant agent polyethylene glycol were added, followed by investigation of cross-linking property, scorch resistance, sweat-out, thermal aging property and electric insulation property. The results are shown in Table 2.

EXAMPLE 2

An experiment was performed in the same manner as described in Example 1 except that 0.2 weight part of 4,4'-thiobis(2-t-butyl-5-methylphenol) and 0.15 weight part of 4,6-bis(octylthiomethyl)-o-cresol were added, followed by investigation of cross-linking property, scorch resistance, sweat-out, thermal aging property and electric insulation property. The results are shown in Table 2.

EXAMPLE 3

An experiment was performed in the same manner as described in Example 1 except that 0.15 weight part of 4,4'-thiobis(2-t-butyl-5-methylphenol) and 0.2 weight part of 4,6-bis(octylthiomethyl)-o-cresol were added, followed by investigation of cross-linking property, scorch resistance, sweat-out, thermal aging property and electric insulation property. The results are shown in Table 2.

EXAMPLE 4

An experiment was performed in the same manner as described in Example 1 except that 0.1 weight part of 4,4'-thiobis(2-t-butyl-5-methylphenol) and 0.25 weight part of 4,6-bis(octylthiomethyl)-o-cresol were added, followed by investigation of cross-linking property, scorch resistance, sweat-out, thermal aging property and electric insulation property. The results are shown in Table 2.

COMPARATIVE EXAMPLE 1

An experiment was performed in the same manner as described in Reference Example 1 except that 0.35 weight part of 4,4'-thiobis(2-t-butyl-5-methylphenol) and 0.5 weight part of the water tree retardant agent polyethylene glycol were added, followed by investigation of cross-linking property, scorch resistance, sweat-out, thermal aging property and electric insulation property. The results are shown in Table 2.

COMPARATIVE EXAMPLE 2

An experiment was performed in the same manner as described in Comparative Example 1 except that 0.35 weight part of 4,6-bis(octylthiomethyl)-o-cresol and 0.5 weight part of the water tree retardant agent polyethylene glycol were added, followed by investigation of cross-linking property, scorch resistance, sweat-out, thermal aging property and electric insulation property. The results are shown in Table 2.

TABLE 2

|  | Example 1 | Example 2 | Example 3 | Example 4 | Comparative Example 1 | Comparative Example 2 |
|---|---|---|---|---|---|---|
| LDPE | 100 | 100 | 100 | 100 | 100 | 100 |
| Cross-linking agent | 2.0 | 2.0 | 2.0 | 2.0 | 2.0 | 2.0 |
| Antioxidant A | 0.25 | 0.20 | 0.15 | 0.10 | 0.35 | — |
| Antioxidant B | 0.10 | 0.15 | 0.20 | 0.25 | — | 0.35 |
| Tree retardant agent | 0.5 | 0.5 | 0.5 | 0.5 | 0.5 | 0.5 |
| Dispersion | Good | Good | Good | Good | Not bad | Good |
| Sweat-out (ppm) | 300 | 200 | 120 | 100 | 750 | 50 |
| Void | Good | Good | Good | Good | Good | Not bad |
| Cross-linking degree (%) | 85.0 | 84.7 | 84.8 | 84.5 | 85.2 | 84.4 |
| Hot-elongation (%) | 68 | 70 | 72 | 80 | 65 | 80 |
| Tensile strength at room temp. (kg/cm$^2$) | 232 | 240 | 230 | 230 | 235 | 225 |
| Elongation at room temp. (%) | 575 | 560 | 590 | 580 | 570 | 560 |
| Tensile strength after aging (kg/cm$^2$) | 234 | 235 | 228 | 224 | 223 | 210 |
| Elongation after aging (%) | 540 | 525 | 530 | 535 | 555 | 530 |
| Scorch resistance (min:sec) | 10:30 | 10:55 | 11:38 | 12:12 | 9:10 | 12:52 |
| Breakdown strength (Kv/mm) | 77.7 | 79.1 | 78.3 | 77.2 | 75.0 | 65.1 |

1. Low-density polyethylene: LUTENE ® CB2030 (LG chem., Ltd., Korea)
2. Cross-linking agent: dicumyl peroxide (DCP)
3. Antioxidant A: 4,4'-thiobis(2-t-butyl-5-methylphenol)
4. Antioxidant B: 4,6-bis(octylthiomethyl)-o-cresol
5. Tree retardant agent: polyethylene glycol As shown in Table 2, the co-treatment of the solid antioxidant 4,4'-thiobis(2-t-butyl-5-methylphenol) and the liquid antioxidant 4,6-bis(octylthiomethyl)-o-cresol resulted in the synergistic effect, so that dispersion was excellent, and sweat-out and void generation were inhibited, compared with the cases of a single treatment of each as shown in Comparative Example 1 and Comparative Example 2. In addition, physical properties including the cross-linking property, tensile strength and elongation after aging at high temperature, and scorch resistance were similarly high to those of the Comparative Examples. In conclusion, dispersion was excellent and void generation was inhibited in Examples 1-4, compared with in the Comparative Examples, suggesting excellent insulation strength.

C. Water Tree Growth Rate

Water tree growth rate was measured according to polyethylene glycol content. U.S. Pat. No. 4,144,202 describes a method for measuring the water tree growth rate and growth speed. In the present invention, water tree growth inhibition was investigated by measuring time (30 days) dependent water tree length based on ASTM D6097.

As shown in FIG. 1a, water tree length was measured by using accelerated water tree degradation apparatus and the precise test method was as follows. A flat-form molded sample was inserted in a conical needle introducer of FIG. 1b to a point 3.2 mm away from the end of the sample, followed by pressing at 180° C. As a result, a cross-linked sample for measuring the water tree was prepared. The angle of the used needle was 60° and the radius of the needle was 3 μm.

To the prepared sample was added 0.01 M NaCl solution, into which 50 mm platinum wire was put, followed by applying 5 kV AC for 720 hours. To measure the water tree growth, the sample was sliced and observed under an optical microscope to measure the final length of the water tree. The water tree length measured above was the average of the total samples and the water tree growth rate was calculated by the following formula:

$$\text{Inhibition rate of water tree growth } (\%) = \frac{L_1}{L_2} \times 100$$

In the above formula, $L_1$ indicates the length from the notch of one end of the sample to the opposite surface (3.2 mm) and $L_2$ indicates the water tree length measured from the notch of one end of the sample to the opposite surface.

EXAMPLE 5

An experiment was performed in the same manner as described in Example 1 except that 0.20 weight part of 4,4'-thiobis(2-t-butyl-5-methylphenol), 0.15 weight part of 4,6-bis(octylthiomethyl)-o-cresol and 0.3 weight part of the water tree retardant agent polyethylene glycol were added, followed by investigation of water tree growth and thermal aging properties. The results are shown in Table 3.

EXAMPLE 6

An experiment was performed in the same manner as described in Example 5 except that 0.55 weight part of polyethylene glycol was added, followed by investigation of water tree growth and thermal aging properties. The results are shown in Table 3.

EXAMPLE 7

An experiment was performed in the same manner as described in Example 5 except that 0.7 weight part of polyethylene glycol was added, followed by investigation of water tree growth and thermal aging properties. The results are shown in Table 3.

COMPARATIVE EXAMPLE 3

An experiment was performed in the same manner as described in Example 5 except that 1.0 weight part of polyethylene glycol was added, followed by investigation of water tree growth and thermal aging properties. The results are shown in Table 3.

COMPARATIVE EXAMPLE 4

An experiment was performed in the same manner as described in Example 5 except that 0.1 weight part of polyethylene glycol was added, followed by investigation of water tree growth and thermal aging properties. The results are shown in Table 3.

COMPARATIVE EXAMPLE 5

An experiment was performed in the same manner as described in example 5 except that 0.20 weight part of 4,4'-thiobis(2-t-butyl-5-methylphenol) and 0.15 weight part of 4,6-bis(octylthiomethyl)-o-cresol were added and polyethylene glycol was excluded. Water tree growth and thermal aging properties were investigated and the results are shown in Table 3.

As shown in Table 3, the water tree growth measured after treatment with 0.1 weight part of polyethylene glycol in Comparative Example 4 was similar to that obtained without treatment with polyethylene glycol in Comparative Example 5, indicating that the polyethylene glycol content in the composition of the present invention has to be at least 0.2 weight part to be effective. In the meantime, if the polyethylene glycol content in the composition is at least 1.0 weight part, as shown in Comparative Example 3, physical properties before and after aging are decreased rapidly and it is less economical in industry.

INDUSTRIAL APPLICABILITY

The cross-linked polyethylene composition of the present invention exhibits excellent dispersion and void generation inhibiting effects attributed to the synergistic effect of the co-treatment of a liquid antioxidant and a solid antioxidant and polyethylene glycol. The composition of the invention also has excellent cross-linking and physical properties, scorch resistance and water tree inhibition activity, so that it can be effectively applied to an electrical power cable with excellent insulation properties.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

TABLE 3

| | Example 5 | Example 6 | Example 7 | Comparative Example 3 | Comparative Example 4 | Comparative Example 5 |
|---|---|---|---|---|---|---|
| LDPE | 100 | 100 | 100 | 100 | 100 | 100 |
| Cross-linking agent | 2.0 | 2.0 | 2.0 | 2.0 | 2.0 | 2.0 |
| Antioxidant A | 0.20 | 0.20 | 0.20 | 0.20 | 0.20 | 0.20 |
| Antioxidant B | 0.15 | 0.15 | 0.15 | 0.15 | 0.15 | 0.15 |
| Tree retardant agent | 0.3 | 0.55 | 0.7 | 1.0 | 0.1 | — |
| Tree growth rate (%) | 10.90 | 8.25 | 7.18 | 3.75 | 20.31 | 24.4 |
| Tensile strength at room temp. (kg/cm$^2$) | 244 | 238 | 205 | 180 | 252 | 250 |
| Elongation at room temp. (%) | 580 | 565 | 530 | 510 | 578 | 570 |
| Tensile strength after aging (kg/cm$^2$) | 240 | 230 | 175 | 95 | 245 | 248 |
| Elongation after aging (%) | 545 | 532 | 470 | 290 | 560 | 565 |

1. Low-density polyethylene: LUTENE ® CB2030 (LG chem., Ltd., Korea)
2. Cross-linking agent: dicumyl peroxide (DCP)
3. Antioxidant A: 4,4'-thiobis(2-t-butyl-5-methylphenol)
4. Antioxidant B: 4,6-bis(octylthiomethyl)-o-cresol
5. Tree retardant agent: polyethylene glycol

The invention claimed is:

1. A cross-linked polyethylene composition characteristically comprising
   (A) 100 weight part of polyethylene;
   (B) 0.2-0.6 weight part of a mixture of a liquid antioxidant of Formula 1 and a hindered phenol or thio ester solid antioxidant;
   (C) 0.2-0.9 weight part of polyethylene glycol having a molecular weight of 5,000-70,000; and
   (D) 1-4 weight part of a cross-linking agent.

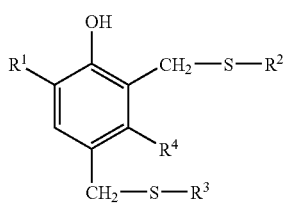

[Formula 1]

wherein,
$R^1$ is $C_{1-20}$ alkyl substituted or non-substituted with one or more substituents selected from a group consisting of $C_{2-20}$ alkenyl, $C_{3-20}$ alkynyl, $C_{5-9}$ cycloalkyl, phenyl or tolyl,
$R^2$ and $R^3$ are independently $C_{1-20}$ alkyl substituted or non-substituted with one or more substituents selected from the group consisting of phenyl, hydroxyl, cyano, formyl, acetyl and —O—$COR^5$,
$R^5$ is $C_{5-9}$ cycloalkyl, phenyl, 4-chlorophenyl, 2-methoxycarbonylphenyl, p-tolyl, 1,3-benzthiazole-2-yl, —$(CHR^6)_n COOR^7$ or —$(CHR^6)_n CONR^8 R^9$ substituted or non-substituted with one or more substituents selected from the group consisting of $C_{1-20}$ alkyl, $C_{2-20}$ alkenyl, $C_{3-20}$ alkynyl and hydroxy,
n is 1 or 2; $R^6$ is H or $C_{1-6}$ alkyl; $R^7$ is $C_{1-20}$ alkyl, $C_{1-20}$ alkyl containing 1-5 hetero atoms selected from O or S, $C_{5-9}$ cycloalkyl, phenyl, benzyl or tolyl; $R^8$ and $R^9$ are independently H or $C_{1-6}$ alkyl; $R^4$ is H or methyl.

2. The cross-linked polyethylene composition according to claim 1, wherein the polyethylene is an ethylene homopolymer polymerized by free radical initiation in a high pressure tubular reactor of at least 1000 bar or an autoclave reactor.

3. The cross-linked polyethylene composition according to claim 1, wherein the polyethylene is an ethylene copolymer prepared under low pressure of up to 100 bar in the presence of Ziegler-Natta catalyst or metallocene catalyst.

4. The cross-linked polyethylene composition according to claim 3, wherein the metallocene catalyst is an organometallic compound prepared by ligand binding between a cyclopentadiene derivative and a transition metal selected from the group consisting of titanium, zirconium, hafnium and vanadium.

5. The cross-linked polyethylene composition according to claim 3, wherein the ethylene copolymer is prepared by using α-olefin having at least 3 carbons as a comonomer.

6. The cross-linked polyethylene composition according to claim 5, wherein the α-olefin having at least 3 carbons is one or more compounds selected from the group consisting of propylene, 1-butene, 1-pentene, 1-hexene and 1-octene.

7. The cross-linked polyethylene composition according to claim 1, wherein the polyethylene has a density of 0.87~0.96 g/cm$^1$, a melt index of 0.1~50 g/10 minutes and a weight average molecular weight (Mw) of 40,000~200,000.

8. The cross-linked polyethylene composition according to claim 1, wherein $R^1$ is $C_{1-4}$ alkyl, $R^2$ and $R^3$ are independently $C_{6-15}$ alkyl substituted or non-substituted with hydroxy, and $R^4$ is H.

9. The cross-linked polyethylene composition according to claim 8, wherein the liquid antioxidant of Formula 1 is 4,6-bis(octylthiomethyl)-o-cresol or 4,6-bis(dodecylthiomethyl)-o-cresol.

10. The cross-linked polyethylene composition according to claim 1, wherein the hindered phenol antioxidant is one or more compounds selected from the group consisting of 2,2'-thiodiethylbis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2.2'-thiobis(6-t-butyl-4-methylphenol), octadecyl-[3-(3,5-di-t-butyl-4-hydroxyphenyl)-propionate], 4,4'-thiobis(2-t-butyl-5-methylphenol) and triethyleneglycol-bis-[3-(3-t-butyl-4-hydroxy-5-methylphenyl)propionate].

11. The cross-linked polyethylene composition according to claim 1, wherein the thio ester solid antioxidant is one or more compounds selected from the group consisting of distearyl thiodipropionate and dilauryl thiodipropionate.

12. The cross-linked polyethylene composition according to claim 1, wherein the weight ratio of the liquid antioxidant of Formula 1 to the hindered phenol or thio ester solid antioxidant is 1:5-5:1.

13. The cross-linked polyethylene composition according to claim 12, wherein the weight ratio of the liquid antioxidant of Formula 1 to the hindered phenol or thio ester solid antioxidant is 1:3-3:1.

14. The cross-linked polyethylene composition according to claim 1, wherein the polyethylene glycol has a molecular weight of 10,000-50,000 and the polyethylene glycol content for 100 weight part of polyethylene is 0.3-0.8 weight part.

15. The cross-linked polyethylene composition according to claim 1, wherein the cross-linking agent is one or more compounds selected from the group consisting of dicumyl peroxide, benzoyl peroxide, lauryl peroxide, tert-butyl cumyl peroxide, di(tert-butyl peroxy isopropyl)benzene), 2,5-dimethyl-2,5-di(tert-butyl peroxy)hexane and di(tert-butyl)peroxide.

16. The cross-linked polyethylene composition according to claim 15, wherein the cross-linking agent is dicumyl peroxide (DCP).

17. A preparation method of a cross-linked polyethylene composition comprising the steps of:
   (i) mixing and processing by extrusion (A) 100 weight part of polyethylene; (B) 0.2-0.6 weight part of a mixture of a liquid antioxidant of Formula 1 and a hindered phenol or a thio ester solid antioxidant; (C) 0.2-0.9 weight part of polyethylene glycol having a molecular weight of 5,000-70,000; and (D) 1-4 weight part of a cross-linking agent; and
   (ii) performing a cross-linking of the extrudate obtained step (i) at a higher temperature than the decomposition temperature of the cross-linking agent.

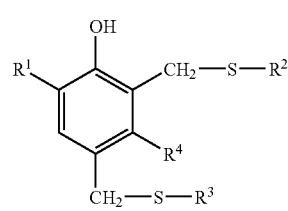

[Formula 1]

wherein,

R$^1$ is C$_{1-20}$ alkyl substituted or non-substituted with one or more substituents selected from the group consisting of C$_{2-20}$ alkenyl, C$_{3-20}$ alkynyl, C$_{5-9}$ cycloalkyl, phenyl or tolyl, R$^2$ and R$^3$ are independently C$_{1-20}$ alkyl substituted or non-substituted with one or more substituents selected from the group consisting of phenyl, hydroxyl, cyano, formyl, acetyl and —O—COR$^5$, R$^5$ is C$_{5-9}$ cycloalkyl, phenyl, 4-chlorophenyl, 2-methoxycarbonylphenyl, p-tolyl, 1,3-benzthiazole-2-yl, —(CHR$^6$)$_n$COOR$^7$ or —(CHR$^6$)$_n$CONR$^8$R$^9$ substituted or non-substituted with one or more substituents selected from the group consisting of C$_{1-20}$ alkyl, C$_{2-20}$ alkenyl, C$_{3-20}$ alkynyl and hydroxy, n is 1 or 2; R$^6$ is H or C$_{1-6}$ alkyl; R$^7$ is C$_{1-20}$ alkyl, C$_{1-20}$ alkyl containing 1-5 hetero atoms selected from O or S, C$_{5-9}$ cycloalkyl, phenyl, benzyl or tolyl; R$^8$ and R$^9$ are independently H or C$_{1-6}$ alkyl; R$^4$ is H or methyl.

18. The preparation method of the cross-linked polyethylene composition according to claim 17, wherein step (i) is composed of the steps of preparing a master batch (a) containing an antioxidant mixture and polyethylene glycol mixture, or an antioxidant mixture, polyethylene glycol and a cross-linking agent mixture; and introducing polyethylene or polyethylene and a cross-linking agent mixture into an extruder to which the master batch prepared in step (a) is added or each additive is directly added, followed by extrusion (b).

19. A cable, which contains a layer of the cross-linked polyethylene composition of claim 1.

20. The cable according to claim 19, wherein the cross-linked polyethylene composition covers a conductor or a semiconductive layer of the cable.

* * * * *